United States Patent [19]

Minami et al.

[11] 4,232,139

[45] Nov. 4, 1980

[54] PROCESS FOR PRODUCING POLYMERS OR COPOLYMERS OF OLEFINS CONTAINING AT LEAST 3 CARBON ATOMS

[75] Inventors: Syuji Minami, Ohtake; Norio Kashiwa, Iwakuni, both of Japan

[73] Assignee: Mitsui Petrochemical Industries Ltd., Tokyo, Japan

[21] Appl. No.: 801,234

[22] Filed: May 27, 1977

[30] Foreign Application Priority Data

Jun. 2, 1976 [JP] Japan .................................. 51-63536

[51] Int. Cl.³ .......................... C08F 4/02; C08F 10/06
[52] U.S. Cl. .............................. 526/125; 252/429 B; 526/124; 526/141; 526/142; 526/143; 526/351
[58] Field of Search ...................... 526/124, 125, 142

[56] References Cited

U.S. PATENT DOCUMENTS

| | | | |
|---|---|---|---|
| 4,069,169 | 1/1978 | Toyota et al. | 526/125 |
| 4,085,276 | 4/1978 | Toyota et al. | 526/125 |
| 4,107,414 | 8/1978 | Giannini et al. | 526/125 |
| 4,107,416 | 8/1978 | Giannini et al. | 526/125 |
| 4,115,319 | 9/1978 | Scata et al. | 526/124 |
| 4,143,223 | 3/1979 | Toyota et al. | 526/125 |

FOREIGN PATENT DOCUMENTS

| | | | |
|---|---|---|---|
| 2000566 | 11/1970 | Fed. Rep. of Germany | 526/124 |
| 1387890 | 3/1975 | United Kingdom | 526/125 |

*Primary Examiner*—Edward J. Smith
*Attorney, Agent, or Firm*—Sherman & Shalloway

[57] ABSTRACT

A process for producing a polymer or copolymer of an olefin containing at least 3 carbon atoms which comprises polymerizing or copolymerizing at least one olefin containing at least 3 carbon atoms, or copolymerizing the olefin with up to 10% mole of ethylene and/or a diolefin, in the presence of a catalyst composed of (A) a magnesium-containing solid titanium composition and (B) an organometallic compound of a metal of Groups I to III of the periodic table; characterized in that the solid titanium composition (A) is a composition formed by contacting (i) a halogen-containing magnesium organo-aromatic compound of the formula $Mg(OR)_n X_{2-n}$ wherein R represents an aryl or aralkyl group and n is a positive number of $0<n<2$, (ii) an organic acid ester, and (iii) a titanium compound in the absence of mechanical pulverization.

9 Claims, No Drawings

PROCESS FOR PRODUCING POLYMERS OR COPOLYMERS OF OLEFINS CONTAINING AT LEAST 3 CARBON ATOMS

This invention relates to a process for producing a highly stereoregular polymer or copolymer of an olefin containing at least 3 carbon atoms. Specifically, the invention relates to an improved process for producing a highly stereoregular polymer or copolymer of an olefin containing at least 3 carbon atoms in high yields in a suitable particulate form having a relatively large particle diameter, which process can prevent the formation of a very fine powdery product that causes various troubless such as the blockage of pipes at the time of transporting a slurry containing the resulting polymer or copolymer, the difficulty of separating the polymer or copolymer, or the clogging of machine components.

More specifically, this invention relates to a process for producing a polymer or copolymer of an olefin containing at least 3 carbon atoms, which comprises polymerizing or copolymerizing at least one olefin containing at least 3 carbon atoms, or copolymerizing the olefin with up to 10 mole% of ethylene and/or a diolefin, in the presence of a catalyst composed of (A) a magnesium-containing solid titanium composition and (B) an organometallic compound of a metal of Groups I to III of the periodic table; characterized in that the solid titanium composition (A) is a composition formed by contacting (i) a halogen-containing magnesium organo-aromatic compound of the formula $Mg(OR)_nX_{2-n}$ wherein R is an aryl group or aralkyl group and n is a positive number of $0<n<2$, (ii) an organic acid ester and (iii) a titanium compound in the absence of mechanical pulverization.

Many prior suggestions are known for polymerizing or copolymerizing olefins in the presence of a catalyst composed of a magnesium-containing solid titanium composition and an organometallic compound of a metal of Groups I to III of the periodic table. In many of these suggestions, a magnesium-containing solid titanium compound obtained by chemically depositing a titanium compound on a halogen compound of magnesium such as a magnesium dihalide, magnesium hydroxychloride or magnesium alkoxyhalide is utilized as a catalyst component. It is also known that halogen-free magnesium compounds can be converted to feasible magnesium-containing solid titanium compounds by using suitable halogenating agents or halogen-containing titanium compounds during the catalyst-forming reaction.

None of the many prior suggestions of Zielger-type catalysts composed of a magnesium-containing solid titanium component and an organometallic compound component, in practice, have provided a method for producing by using the magnesium compound of this invention a catalyst which exhibits satisfactory stereoregularity and activity in the polymerization or copolymerization of olefins containing at least 3 carbon atoms, especially propylene, without using a complicated, disadvantageous and costly mechanical pulverization treatment such as ball mill pulverization or vibratory mill pulverization.

Many of conventional catalysts containing a magnesium-containing solid titanium compound also have the defect that they exhibit only inferior activity in the polymerization of propylene and the copolymerization of a monomeric mixture containing a major proportion of propylene while they do show fairly good polymerization activity in the polymerization of ethylene or the copolymerization of a monomeric mixture containing a major proportion of ethylene, or they cannot afford highly stereoregular polypropylene. Thus, such catalysts are not feasible for obtaining highly stereoregular polymers or copolymers of olefins containing at least 3 carbon atoms in high yields. Moreover, the use of some of such catalysts causes the formation of unnegligible amounts of very fine powdery polymer or copolymers which will cause various troubles in their post-treatment.

As one prior suggestion, West German Laid-Open Patent Specification No. 2,620,886 (laid open on Nov. 25, 1976 with a priority claimed from Italian Patent Application No. 23396A/75 filed May 16, 1975) discloses a process for producing α-olefins using as the magnesium-containing solid titanium catalyst component a reaction product obtained by contacting a Ti-halogenated compound with a product of the reaction between a specified magnesium compound and a specified aluminum halide, or a reaction product obtained by contacting an aluminum halide with a product of the reaction between the specified magnesium compound, magnesium halide or magnesium oxyhalide and a Ti-alcoholate. In this process an organometallic compound to be reacted with the above-mentioned catalyst component is used in the form of an addition and/or substitution product of an electron donor compound (Lewis base) with an alkyl aluminum or a reaction product of a Lewis base with an alkyl aluminum.

The German Specification shows that organic acid esters can be used as the electron donor to form an addition and/or substitution product of an organic acid ester with an alkyl aluminum. The excellent advantages of this invention will be easily understood from the results of Comparative Example 3 shown hereinbelow in comparison with Example 1 in accordance with the process of this invention.

Another suggestion is disclosed in Japanese Patent Publication No. 42137/72 (published Oct. 24, 1972; Convention priority claimed from British Patent Application No. 706/69 filed on Jan. 6, 1969) and Japanese Laid-Open Patent Application Publication No. 8395/72 (laid open on May 2, 1972; published as Japanese Patent Publication No. 30118/76 on Aug. 30, 1976; Convention priority claimed from Luxemburg Patent Application No. 61816 filed Oct. 6, 1970). In these suggestions, an organic acid ester (ii), which is essential in the present invention, is not used in the formation of a magnesium-containing solid titanium catalyst component. Polymerization of an olefin containing at least 3 carbon atoms such as propylene using the catalysts suggested in these Japanese patents cannot afford a highly stereoregular polymer. This can be seen from the fact that these specifications show only the polymerization of ethylene. It is more apparent from the results of Comparative Example 4 given hereinbelow.

Japanese Laid-Open Patent Application Publication No. 126590/75 (laid open on Oct. 4, 1975) discloses that in the preparation of a magnesium-containing solid titanium catalyst component, it is essential to perform contacting with a titanium tetrahalide in the liquid or gaseous phase by mechanical pulverization using a ball mill, vibratory mill, etc. The use of mechanical pulverization is disadvantageous, and moreover, the resulting polymer tends to become a very fine powder.

Japanese Laid-Open Patent Publication No. 10385/75 (laid open on Aug. 26, 1975) and Japanese Laid-Open Patent Publication No. 20297/75 (laid open on Feb. 18, 1976) suggest the use of a reaction product comprising a magnesium halide, a silicon compound, an organic carboxylic acid ester and a titanium compound as essential ingredients as a magnesium-containing solid titanium catalyst component. In these suggestions, it is desirable to use a copulverizing means so as to form a satisfactory solid titanium catalyst component.

The present inventors worked extensively in order to provide an improved process for preparing a polymer or copolymer of an olefin containing at least 3 carbon atoms which can overcome the disadvantages associated with the conventional techniques. As a result, they found that the use of an organo-aromatic compound containing a halogen and aryloxy or aralkyloxy moiety which is expressed by the abovegiven formula $Mg(OR)_nX_{2-n}$ can afford a highly stereoregular polymer or copolymer of an olefin containing at least 3 carbon atoms in high yields while inhibiting the formation of a very fine powdery product without the need for the disadvantageous mechanical pulverization or many reaction components. It was also found that the number of catalyst-forming components can be reduced, the means for preparing the catalyst is simple, and the catalyst has good reproducibility of quality and can afford a polymer or copolymer of an olefin containing at least 3 carbon atoms with commercial advantage.

It is an object of this invention to provide a process for providing a highly stereoregular polymer or copolymer of an olefin containing at least 3 carbon atoms in high yields and with commercial advantages.

The above an other objects and advantages of the invention will become more apparent from the following description.

The magnesium-containing solid titanium catalyst component used in this invention is a solid titanium composition which is obtained by contacting (i) a halogen-containing magnesium organo-aromatic compound of the formula $Mg(OR)_nX_{2-n}$ wherein R represents an aryl or aralkyl group and n is a positive number of $0 < n < 2$, (ii) an organic acid ester, and (iii) a titanium compound in the absence of mechanical pulverization.

The "mechanical pulverization", as used herein, means a mechanical pulverizing operation by which a vigorous mechanical pulverizing action typified by pulverization in a ball mill, vibratory mill or impact mill is exerted in contacting two or three of the components (i), (ii) and (iii). An ordinary stirring operation for ensuring good contact is not included within the definition of mechanical pulverization.

The halogen-containing magnesium organo-aromatic compound (i) used to form the solid titanium component which forms the catalyst used in this invention contains halogen, magnesium and an aromatic hydrocarbon moiety belonging to an aryl group or aralkyl group represented by R in the above-given formula. A solid titanium component prepared by using a compound of the above formula in which R is an aliphatic hydrocarbon moiety gives a catalyst of inferior activity, and does not serve to achieve the improvements intended by the present invention.

Examples of preferred species of R in the halogen-containing magnesium organo-aromatic compound of the formula $Mg(OR)_nX_{2-n}$ are a phenyl group which is optionally substituted by a lower alkyl group containing 1 to 4 carbon atoms, a lower alkoxy group containing 1 to 4 carbon atoms or a halogen atom such as chlorine, bromine or iodine, and phenyl lower ($C_1$-$C_4$) alkyl groups substituted by a lower alkyl group containing 1 to 4 carbon atoms, a lower alkoxy group containing 1 to 4 carbon atoms or a halogen atom. Especially preferred compounds are those of the above formula in which X is chlorine and n is 1.

Thus, according to one preferred embodiment of this invention, the compound of the formula $Mg(OR)_nX_{2-n}$ is one in which R is a moiety selected from the group consisting of phenyl, naphthyl, lower alkyl-substituted phenyl, lower alkyl-substituted naphthyl, lower alkoxy-substituted phenyl, lower alkyl-substituted naphthyl, lower alkoxy-substituted phenyl, lower alkoxy-substituted naphthyl, halogen-substituted phenyl, halogen-substituted naphthyl, phenyl lower alkyl, lower alkyl-substituted phenyl lower alkyl, lower alkoxy-substituted phenyl lower alkyl and halogen-substituted phenyl lower alkyl. Specific examples of such compounds are shown below (in the formulae, n is $0 < n < 2$).

Aryloxy-containing magnesium compounds such as $Mg(OC_6H_5)_nX_{2-n}$, $Mg(OC_6H_4—CH_3)_nX_{2-n}$, $Mg(OC_6H_4—C_2H_5)_nX_{2-n}$, $Mg(OC_6H_4—C_3H_7)_nX_{2-n}$, $Mg(OC_6H_4—C_4H_9)_nX_{2-n}$, $Mg(OC_6H_4—C_8H_{17})_nX_{2-n}$, $Mg(OC_6H_4—C_9H_{19})_nX_{2-n}$, $Mg[OC_6H_3—(CH_3)_2]_nX_{2-n}$, $Mg[OC_6H_3—(CH_3)(C_2H_5)]_nX_{2-n}$, $Mg[OC_6H_3—(C_2H_5)_2]_nX_{2-n}$, $Mg[OC_6H_2—(CH_3)_3]_nX_{2-n}$, $Mg[OC_6H_2—(CH_3)_2(C_3H_7)]_nX_{2-n}$, $Mg[OC_6H_2—(CH_3)_2(C_4H_9)]_nX_{2-n}$, $Mg(OC_6H_4Cl)_nX_{2-n}$, $Mg(OC_6H_4OCH_3)_nX_{2-n}$, $Mg(OC_{10}H_7)_nX_{2-n}$, $Mg(OC_{10}H_6—CH_3)_nX_{2-n}$, $Mg(OC_{10}H_6OCH_3)_nX_{2-n}$, and $Mg(OC_{10}H_6Cl)_nX_{2-n}$; aralkyloxy-containing magnesium compounds such as $Mg(OCH_2—C_6H_5)_nX_{2-n}$, $Mg(OC_2H_4—C_6H_5)_nX_{2-n}$, $Mg(OC_3H_6—C_6H_5)_nX_{2-n}$, $Mg(OC_4H_8—C_6H_5)_nX_{2-n}$, $Mg(OCH_2—C_6H_4—CH_3)_nX_{2-n}$, $Mg(OCH_2—C_6H_4—C_3H_7)_nX_{2-n}$, $Mg(OC_3H_6—C_6H_4—C_3H_7)_nX_{2-n}$, and $Mg(OC_3H_6—C_6H_4—C_6H_5)_nX_{2-n}$.

The compound of formula $Mg(OR)_nX_{2-n}$ used in the process of this invention may be a single compound or a mixture of two or more compounds. There is no particular restriction of the method of producing a compound of formula $Mg(OR)_nX_{2-n}$, and any known method can be used.

For example, it can be prepared by reacting a Grignard compound of the formula R"MgX in which R" represents an alkyl group or aryl group, and X is a halogen atom, with a compound containing in the molecule a moiety or bond selected from the group consisting of a hydroxyl group, a carbonyl group, a carboxyl group, an ester bond and an ether bond, such as phenol, cresol, 2,6-dimethyl phenol, acetophenone, benzophenone, benzoic acid, benzaldehyde, methyl benzoate, ethyl benzoate, benzoic acid amide, benzoic acid chloride, diphenyl ether, benzyl alcohol, ethyl toluate, phthalic anhydride, naphthol and p-methyl benzyl chloride. Or it can be produced by reacting the aforesaid Grignard reagent with an aliphatic alcohol to afford a compound of the formula $Mg(OR''')_nX_{2-n}$ in which R''' represents an alkyl group containing 1 to 8 carbon atoms, X is a halogen atom, and n is $0 < n < 2$, and subjecting the resulting compound to an exchange reaction with an aryloxy-containing metal compound such as $Al(OC_6H_5)_3$, $Ca(OC_6H_5)_2$ or $Si(C_2H_5)_3(OC_6H_5)$, an alkoxy-containing metal compound containing an aromatic ring such as $Al(OCH_2—C_6H_5)_3$ or $Si(C_2H_5)_3(OCH_2—C_6H_5)$, a phenol or aromatic alcohol such as phenol, cresol, 2,6-dimethyl phenol, β-phenyl ethyl alcohol or naphthol.

The compound of the formula $Mg(OR)_nX_{2-n}$ can be obtained by reacting a compound of formula $MgX_2$ wherein X is as defined above with the compound $Mg(OR)_2$.

Examples of the organic acid ester (ii) used to form the solid titanium component constituting the catalyst used in this invention are aliphatic acid esters (ii-a), alicyclic acid esters (ii-b), and aromatic acid esters (ii-c).

Examples of the aliphatic esters (ii-a) are esters formed between carboxylic acids or halogen-substitution products selected from the group consisting of saturated or unsaturated aliphatic carboxylic acids containing 1 to 18 carbon atoms, preferably 1 to 4 carbon atoms, and their halogen-substitution products, and alcohols or phenols selected from the group consisting of saturated or unsaturated aliphatic primary alcohols containing 1 to 18 carbon atoms, preferably 1 to 4 carbon atoms, saturated or unsaturated alicyclic alcohols containing 3 to 8 carbon atoms, preferably 5 to 6 carbon atoms, phenols containing 6 to 10 carbon atoms, preferably 6 to 8 carbon atoms, and $C_1$-$C_4$ saturated or unsaturated aliphatic primary alcohols bonded to the ring carbon atom of a $C_3$-$C_{10}$ aliphatic or aromatic ring; and lactones containing 3 to 10 carbon atoms.

Specific examples of the aliphatic esters (ii-a) include primary alkyl esters of saturated fatty acids such as methyl formate, ethyl acetate, n-amyl acetate, 2-ethylhexyl acetate, n-butyl formate, ethyl butyrate or ethyl valerate; alkenyl esters of saturated fatty acids such as vinyl acetate and allyl acetate; primary alkyl esters of unsaturated fatty acids such as methyl acrylate, methyl methacrylate or n-butyl coronate; alkyl esters of halogenated aliphatic monocarboxylic acids such as methyl chloroacetate or ethyl dichloroacetate; and lactones such as pripiolactone, γ-butyrolactone or Δ-valerolactone.

Examples of the alicyclic esters (ii-b) are esters formed between alicyclic carboxylic acids containing 6 to 12 carbon atoms, preferably 6 to 8 carbon atoms, and saturated or unsaturated aliphatic primary alcohols containing 1 to 8 carbon atoms, preferably 1 to 4, carbon atoms. Specific examples include methyl cyclohexanecarboxylate, ethyl cyclohexanecarboxylate, methyl methylcyclohexanecarboxylate, and ethyl methylcyclohexanecarboxylate.

Examples of the aromatic esters (ii-c) are esters formed between aromatic carboxylic acids containing 7 to 18 carbon atoms, preferably 7 to 12 carbon atoms, and alcohols or phenols selected from the group consisting of saturated or unsaturated aliphatic primary alcohols, saturated or unsaturated alicyclic alcohols containing 3 to 8 carbon atoms, preferably 3 to 6 carbon atoms, phenols containing 6 to 10 carbon atoms, preferably 6 to 8 carbon atoms and $C_1$-$C_4$ saturated or unsaturated aliphatic primary alcohols bonded to the ring carbon atom of a $C_3$-$C_{10}$ aliphatic or aromatic ring; and aromatic lactones containing 8 to 12 carbon atoms.

Specific examples of the aromatic ester (ii-c) are alkyl or alkenyl esters, preferably $C_1$-$C_8$, more preferably $C_1$-$C_4$, alkyl ester esters or $C_2$-$C_8$, more preferably $C_2$-$C_4$, alkenyl esters, of benzoic acid, such as methyl benzoate, ethyl benzoate, n- and i-propyl benzoate, n-, i-, sec-, and tert-butyl benzoates, n- and i-amyl benzoates, n-hexyl benzoate, n-octyl benzoate, 2-ethylhexyl benzoate, vinyl benzoate, and allyl benzoate; cycloalkyl or cycloalkenyl esters of benzoic acid, preferably $C_3$-$C_8$, more preferably $C_5$-$C_8$ cycloalkyl or cycloalkenyl esters, of benzoic acid such as cyclopentyl benzoate, cyclohexyl benzoate or cyclohexenyl benzoate; aryl or aralkyl esters, preferably $C_6$-$C_{10}$, more preferably $C_6$-$C_8$, aryl or aralkyl esters optionally containing a substituent such as a halogen arom atom or a $C_1$-$C_4$ lower alkyl group, or benzoic acid such as phenyl benzoate, 4-tolyl benzoate, benzyl benzoate, styryl benzoate, 2-chlorophenyl benzoate or 4-chlorobenzyl benzoate; and aromatic monocarboxylic acid esters in which an electron donating substituent such as a hydroxyl, alkoxy, alkyl or amino group is bonded to the aromatic ring. Examples of the aromatic monocarboxylic acid esters containing the electron donating substituent include esters of hydroxybenzoic acid, preferably $C_1$-$C_8$, more preferably $C_1$-$C_4$, alkyl esters, preferably $C_2$-$C_8$, more preferably $C_2$-$C_4$, alkenyl esters, preferably $C_3$-$C_8$, more preferably $C_5$-$C_8$ cycloalkyl or cycloalkenyl esters, and preferably $C_6$-$C_{10}$, more preferably $C_8$-$C_{10}$ aryl or aralkyl esters, of hydroxybenzoic acid, typified by methyl salicylate, ethyl salicylate, i-butyl salicylate, i-amyl salicylate, allyl salicylate, methyl p-hydroxybenzoate, n-propyl p-hydroxybenzoate, sec-butyl p-hydroxybenzoate, 2-ethylhexyl p-hydroxybenzoate, cyclohexyl p-hydroxybenzoate, phenyl salicylate, 2-tolyl salicylate, benzyl salicylate, phenyl p-hydroxybenzoate, 3-tolyl p-hydroxybenzoate, benzyl p-hydroxybenzoate and ethyl α-resorcylate; esters of alkoxy benzoic acids, preferably esters of lower alkoxy benzoic acids containing 1 to 4 carbon atoms, preferably containing a $C_1$-$C_2$ alkoxyl group, and preferably $C_1$-$C_8$, more preferably $C_1$-$C_4$, alkyl esters, or preferably $C_6$-$C_{10}$, more preferably $C_8$-$C_{10}$, aryl or aralkyl esters of lower alkoxy benzoic acids, such as methyl anisate, ethyl anisate, i-propyl anisate, i-butyl aniste, phenyl anisate, benzyl anisate, ethyl o-emethoxybenzoate, methyl p-ethoxybenzoate, ethyl p-ethoxybenzoate, n-butyl-p-ethoxybenzoate, ethyl p-allyloxybenzoate, phenyl p-ethoxybenzoate, methyl o-ethoxybenzoate, ethyl veratrate and ethyl asym-guacolcarboxylate; esters of alkyl or alkenyl benzoic acids, preferably alkyl or alkenyl benzoatic acids containing preferably $C_1$-$C_8$, more preferably $C_1$-$C_4$, alkyl group or $C_2$-$C_8$, more preferably $C_2$-$C_4$, alkenyl group, and preferably $C_1$-$C_8$, more preferably $C_1$-$C_4$, alkyl esters and preferably $C_6$-$C_{10}$, more preferably $C_8$-$C_{10}$, aryl or aralkyl esters of alkyl or alkenyl benzoic acid, such as methyl p-toluate, ethyl p-toluate, i-propyl p-toluate, n- and i-amyl toluates, allyl p-toluate, phenyl p-toluate, 2-tolyl p-toluate, ethyl o-toluate, ethyl m-toluate, methyl p-ethylbenzoate, ethyl p-ethylbenzoate, sec-butyl p-ethylbenzoate, i-propyl o-ethylbenzoate, n-butyl m-ethylbenzoate, ethyl 3,5-xylenecarboxylate, and ethyl p-styrenecarboxylate; and aminobenzoic acid esters, preferably $C_1$-$C_4$ alkyl esters of aminobenzoic acid, such as methyl p-aminobenzoate and ethyl p-aminobenzoate. Other examples of the aromatic esters (ii-c) include naphthoic acid esters, preferably $C_1$-$C_4$ alkyl esters thereof, such as methyl naphthoate, ethyl naphthoate, propyl naphthoate or butyl naphthoate, and aromatic lactones such as coumarine and phthalide.

Of the aromatic esters (ii-c) exemplified above, esters of benzoic acid, alkyl or alkenyl benzoic acids, and alkoxy benzoic acids are preferred. Especially preferred species are $C_1$-$C_4$ alkyl esters, for example, methyl or ethyl esters, of benzoic acid, o- or p-toluic acid, and p-anisic acid.

Preferred titanium compounds (iii) used to form the solid titanium component of the catalyst used in this invention are tetravalent titanium compounds of the formula $$Ti(OR')_gX_{4-g}$$

wherein R' is an alkyl group containing 1 to 8 carbon atoms, X is a halogen atom such as chlorine, bromine or iodine, and g is a number of 0 to 4.

Specific examples of these titanium compounds are titanium tetrahalides such as $TiCl_4$, $TiBr_4$ or $TiI_4$; alkoxytitanium trihalides such as $Ti(OCH_3)Cl_3$, $Ti(OC_2H_5)Cl_3$, $Ti(O\ n-C_4H_9)Cl_3$, $Ti(OC_2H_5)Br_3$ or $Ti(O\ iso-C_4H_9)Br_3$; alkoxytitanium dihalides such as $Ti(OCH_3)_2Cl_2$, $Ti(OC_2H_5)_2Cl_2$, $Ti(O\ n-C_4H_9)_2Cl$ and $Ti(OC_2H_5)_2Br_2$; trialkoxytitanium monohalides such as $Ti(OCH_3)_3Cl$, $Ti(OC_2H_5)_3Cl$, $Ti(O\ n-C_4H_9)_3Cl$ and $Ti(OC_2H_5)_3Br$; and tetraalkoxytitaniums such as $Ti(OCH_3)_4$, $Ti(OC_2H_5)_4$ and $Ti(O\ n-C_4H_9)_4$. Of these, the titanium tetrahalides are especially preferred. Titanium tetrachloride is most preferred.

The magnesium-containing solid titanium composition (A) used in the process of this invention can be formed by contacting (i) the halogen-containing magnesium organo-aromatic compound of the formula $Mg(OR)_nX_{2-n}$, (ii) the organic acid ester and (iii) the titanium compound in the absence of mechanical pulverization. The order of contact of (i), (ii) and (iii) is optional. Preferably, however, the halogen-containing magnesium organo-aromatic compound (i) is first contacted with the organic acid ester (ii), and the resulting product is contacted with the titanium compound (iii). Contacting of the components (i) and (ii) is preferably carried out in an inert solvent such as a hydrocarbon (e.g., hexane, heptane or kerosene). In this reaction, the organic acid ester (ii) is used in an amount of preferably about 0.01 to 2 moles, more preferably about 0.05 to 1 mole, per magnesium atom of the halogen-containing magnesium organo-aromatic compound (i). When an inert solvent is used in this reaction, the amount of the halogen-containing magnesium organo-aromatic compound calculated as magnesium atom is maintained at about 0.1 to 5 moles per liter of inert solvent. The reaction temperature is preferably about 0° to 200° C., more preferably room temperature (e.g., 20° C.) to 150° C., and the reaction time is 10 minutes to 3 hours.

The reaction of the titanium compound (iii) with a product of the reaction between the compound (i) and the organic acid ester (ii) can be carried out in the presence or absence of an inert solvent. The amount of the titanium compound (iii) is preferably at least 0.01 mole, more preferably at least 0.1 mole, calculated as titanium atom per magnesium atom in the reaction product. Generally, the contacting is performed at room temperature to 130° C. for at least 30 minutes. After the reaction, the product is preferably washed with an inert solent, for example, a hydrocarbon (e.g., hexane, heptane or kerosene), and then used for polymerization. A typical composition preferred for polymerization catalysts of the resulting magnesium-containing solid titanium composition so obtained consists of 1 to 5% by weight of titanium, 10 to 25% by weight of magnesium, 40 to 65% by weight of halogen, and 5 to 20% by weight of the organic acid ester although varying depending upon the catalyst preparing conditions. The magnesium-containing solid titanium catalyst component may include an inorganic or organic extender in addition to the components (i), (ii) and (iii). In this case, the preferred composition will change. The magnesium-containing solid titanium catalyst component has a specific surface area of at least about 10 m²/g, preferably at least 20 m²/g.

The catalyst used in the process of this invention is composed of the magnesium-containing solid titanium composition (A) and the organometallic compound of a metal of Groups I to III of the periodic table (B). The compound (B) is a compound having a hydrocarbon group directly bonded to the metal. Preferably, the metal compounds are organoaluminum compounds.

Examples of the organometal compound (B) are organoaluminum compounds selected from alkylaluminum compounds, alkenylaluminum compounds, alkyl aluminum alkoxides, alkyl aluminum hydrides and alkyl aluminum halides; dialkyl zincs; and dialkyl magnesiums. The alkyl group may be $C_1$–$C_{13}$ alkyl groups. The alkenyl groups may be $C_2$–$C_{13}$ alkenyl groups. The alkoxy groups may be $C_1$–$C_{13}$ alkoxy groups. Specific examples of the organo-metallic compounds (B) include trialkyl or trialkenyl aluminums such as $Al(C_2H_5)_3$, $Al(CH_3)_3$, $Al(C_3H_7)_3$, $Al(C_4H_9)_3$ or $Al(C_{12}H_{25})_3$; alkyl aluminums in which a plurality of aluminum atoms are bonded through an oxygen or nitrogen atom, such as $(C_2H_5)_2AlOAl(C_2H_5)_2$, $(C_4H_9)_2AlOAl(C_4H_9)_2$ or

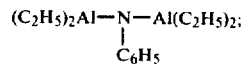

dialkylaluminum hydrides such as $(C_2H_5)_2AlH$ or $(C_4H_9)_2AlH$; dialkylaluminum halides such as $(C_2H_5)_2AlCl$, $(C_2H_5)_2AlI$ or $(C_4H_9)_2AlCl$; and dialkylaluminum alkoxides or phenoxides such as $(C_2H_5)_2Al(OC_2H_5)$ or $(C_2H_5)_2Al(OC_6H_5)$. The trialkyl aluminums are most preferred.

In the process of this invention, at least one olefin containing at least 3 carbon atoms is polymerized or copolymerized, or it is copolymerized with up to 10 mole% of ethylene and/or a diolefin, in the presence of a catalyst composed of the magnesium-containing solid titanium composition and the organometallic compound of the metal of Groups I to III of the periodic table. Examples of the olefins containing at least 3 carbon atoms are propylene, 1-butene and 4-methyl-1-pentene. Examples of the diolesin are are conjugated dienes such as butadiene and cyclopentadiene, and nonconjugated dienes such as 1,4-hexadiene, dicyclopentadiene and ethylidene norbornene.

The polymerization can be carried out in the liquid phase or vapor phase. When it is carried out in the liquid phase, an inert solvent such as hexane, heptane or kerosene may be used as a reaction medium, but the olefin itself may be used as a reaction medium.

In the case of the liquid-phase polymerization, it is preferred to maintain the amount of the solid catalyst component (A) at 0.001 to 0.5 millimole calculated as titanium atom per liter of liquid phase, and the amount of the organometallic compound (B) at 0.1 to 50 millimoles calculated as metal atom per liter of liquid phase.

When the polymerization is carried out in the gaseous phase, the solid titanium catalyst component (a) is used in an amount of preferably 0.001 to 1.0 millimole/liter of gasesous phase, more preferably 0.01 to 0.5 millimole/liter of gaseous phase, calculated as titanium atom. The organoaluminum compound (b) is used preferably in an amount of 0.01 to 50 millimoles/liter of gaseous phase calculated as titanium atom.

The polymerization in accordance with the process of this invention may be carried out in the presence of a molecular weight controller such as hydrogen. For adjustment of stereoregularity, the reaction may also be performed in the copresence of, for example, an ether, an ethylene glycol derivative, an ester such as an organic carboxylic acid ester, an oxygen-containing donor such as an organic acid, an amine, a sulfur-containing organic compound, or a nitrile. Utilization of oxygen-containing aromatic compounds, especially aromatic carboxylic acid esters, is preferred.

Such aromatic carboxylic acid esters can be selected from those usable in the preparation of the magnesium-containing solid titanium catalyst component, preferably from benzoic acid esters and benzoic acid esters ring substituted by an electron-donating substituent. Examples of these esters are benzoic acid esters unsubstituted or substituted by a substituent selected from alkyl groups containing 1 to 4 carbon atoms, alkoxy groups containing 1 to 4 carbon atoms, a hydroxyl group and an amino group, which are selected from $C_1$–$C_{18}$ saturated or unsaturated aliphatic primary alcohol esters, $C_3$–$C_8$ saturated or unsaturated alicyclic alcohol esters, and $C_6$–$C_{10}$ phenol esters. They include benzoic acid esters, toluic acid esters, anisic acid esters, phthalic acid diesters, terephthalic acid diesters, hydroxybenzoic acid esters, and aminobenzoic acid esters. Preferred esters are $C_1$–$C_4$ alkyl esters of p-toluic acid such as methyl p-toluate and ethyl p-toluate.

These aromatic carboxylic acid esters may be used in the form of an addition reaction product with the organometallic compound (B).

The amount of the compound for adjustment of stereoregularity is about 0.001 to 10 moles, preferably about 0.01 to 2 moles, more preferably about 0.1 to 1 mole, per mole of the organometallic compound (B).

The polymerization temperature is preferably about 20° to 200° C., more preferably about 50° to 180° C. The polymerization pressure is preferably normal atmospheric pressure to about 50 kg/cm², more preferably about 2 to 20 kg/cm².

The polymerization can be carried out by a batchwise method, a semi-continuous method, or a continuous method. It is also possible to perform it in two or more stages under different conditions.

The following examples illustrate the present invention in more detail.

EXAMPLES 1 TO 8 AND COMPARATIVE EXAMPLES 1 AND 2

Preparation of catalyst component:

A reactor equipped with a reflux condenser was charged with 200 ml of a commercially available Grignard reagent (a tetrahydrofuran solution of $C_2H_5MgCl$ in a concentration of 2 moles/liter) under a nitrogen atomsphere, and each of the oxygen-containing compounds shown in Table 1 was added gradually to form an alkoxy- or phenoxy-containing magnesium compound. During the reaction, the reaction mixture was maintained at a constant temperature by ice cooling. The tetrahydrofuran was removed by decantation, and 200 ml of refined kerosene was added. Further, each of the organic acid esters shown in Table 1 was added gradually. After the addition, the mixture was heated gradually to 80° C., and reacted at this temperature for 2 hours. After the reaction, the reaction mixture was cooled to room temperature. The resulting solid was collected by filtration, washed with refined hexane, and dried under reduced pressure.

The resulting product was suspended in 300 ml of $TiCl_4$, and with stirring, reacted at 80° C. for 2 hours. After the reaction, the reaction mixture was hot-filtered by a glass filter, fully washed with refined hexane, and dried under reduced pressure to form a magnesium-containing solid titanium catalyst component.

Polymerization:

A 2-liter autoclave was charged with 750 ml of hexane from which oxygen and moisture had been removed completely, and at 40° C. in an atmosphere of propylene, 5.0 millimoles of triethyl aluminum and 1.59 millimoles of methyl p-toluate were added. Five minutes later, the magnesium-containing solid titanium catalyst component was fed in an amount of 0.03 millimole calculated as titanium atom. The reaction system was heated to 60° C., and the total pressure of the reaction system was raised to 8.0 kg/cm² by introducing propylene, and subsequently, 350 ml of hydrogen was introduced. The polymerization of propylene was performed for 4 hours. After the polymerization, the solid product was collected by filtration, and its weight, properties and boiling n-heptane extraction residue were determined.

A solvent-soluble polymer was obtained by concentrating the liquid phase.

The results obtained are summarized in Table 1.

TABLE 1

| | | | Ex. 1 | Ex. 2 | Ex. 3 | Ex. 4 | Ex. 5 | Ex. 6 | Ex. 7 | Ex. 8 | CE. 1 | CE. 2 |
|---|---|---|---|---|---|---|---|---|---|---|---|---|
| Pre-paration of the μg-containing Ti component | Oxygen-containing compound | Type | o-Cresol | 2,6-dimethyl phenol | dimethyl phenol carbinol | 2,4,6-trimethyl phenol | α-naphthol | p-cresol | ethyl benzoate | ethyl toluate | methanol | ethanol |
| | | moles | 0.4 | 0.4 | 0.3 | 0.4 | 0.4 | 0.4 | 0.3 | 0.3 | 0.4 | 0.4 |
| | Organic acid esters | Type | ethyl benzoate | ethyl benzoate | ethyl toluate | ethyl toluate | ethyl benzoate | ethyl benzoate | ethyl amisate | ethyl benzoate | ethyl benzoate | ethyl benzoate |
| | | moles | 0.1 | 0.1 | 0.2 | 0.1 | 0.1 | 0.1 | 0.2 | 0.2 | 0.2 | 0.2 |
| | Analytical value (% by weight) | Ti | 3.5 | 3.2 | 4.0 | 3.7 | 3.2 | 3.3 | 2.9 | 3.4 | 2.7 | 2.8 |
| | | Cl | 56 | 55 | 52 | 55 | 53 | 56 | 59 | 53 | 57 | 55 |
| | | Mg | 16.0 | 17.0 | 17.2 | 16.3 | 15.5 | 18.2 | 17.3 | 16.1 | 15.3 | 16.7 |
| Results of polymerization | Yield of powdery polymer | (g) | 280 | 303 | 252 | 293 | 315 | 273 | 298 | 229 | 78.3 | 69.0 |
| | Solvent-soluble polymer | (g) | 6.2 | 3.8 | 5.3 | 5.2 | 4.7 | 5.5 | 3.3 | 4.9 | 2.2 | 1.8 |
| | Boiling n-heptane extraction | (%) | 93 | 92 | 93 | 91 | 93 | 93 | 92 | 93 | 93 | 94 |

TABLE 1-continued

| * | Ex. 1 | Ex. 2 | Ex. 3 | Ex. 4 | Ex. 5 | Ex. 6 | Ex. 7 | Ex. 8 | CE. 1 | CE. 2 |
|---|---|---|---|---|---|---|---|---|---|---|
| residue | | | | | | | | | | |
| Specific polymerization activity (g-PP/Ti-mmols.hr.atm.) | 298 | 320 | 268 | 311 | 333 | 290 | 314 | 244 | 84 | 74 |
| Bulk density (g/ml) | 0.33 | 0.35 | 0.35 | 0.32 | 0.31 | 0.31 | 0.35 | 0.33 | 0.32 | 0.31 |
| Melt index | 3.9 | 3.5 | 4.7 | 6.8 | 4.5 | 9.2 | 5.3 | 8.3 | 9.5 | 7.6 |

*Example (Ex.) or Comparation Example (CE.)

EXAMPLE 9

Preparation of catalyst component:

Flaky metallic magnesium (9.7 g; 0.4 mole) was added to 300 ml of sufficiently dehydrated tetrahydrofuran, and while refluxing the tetrahydrofuran, 0.4 mole of n-butyl chloride was gradually added dropwise by a dropping funnel. When half (0.2 mole) of the n-butyl chloride was added, the remaining n-butyl chloride on the dropping funnel was well stirred with 0.2 mole of o-cresol. Subsequently, the solution in the dropping funnel was added dropwise. After the addition, 0.1 mole of ethyl benzoate was added to the reaction solution, and reacted for 2 hours at the boiling point of tetrahydrofuran.

After the addition, the solid obtained was collected by filtration, fully washed with hexane, and dried under reduced pressure. The dried product was suspended in 300 ml of $TiCl_4$, and with stirring, reacted at 80° C. for 2 hours.

While the reaction mixture was still hot after the reaction, the reaction product was collected by filtration, fully washed with hexane, and dried under reduced pressure. The resulting titanium catalyst component contained 3.5% by weight of titanium, 55L % by weight of chlorine and 16.2% by weight of magnesium as atoms.

Polymerization:

Propylene was polymerized in the same way as in Example 1 except that 0.03 millimole, calculated as titanium atom, of the titanium catalyst component obtained was used. White powdery polypropylene was obtained in an amount of 275 g. The polymer had a boiling n-heptane extraction residue of 94%, a bulk density of 0.37 g/ml and a melt index of 6.3.

On the other hand, the liquid phase was concentrated to afford 7.2 g of a solvent-soluble polymer.

The average specific polymerization activity of this catalyst was 294 g-PP/Ti-mmole.hr.atm.

EXAMPLE 10

Preparation of catalyst component:

$C_2H_5OMgCl$ (0.3 mole) prepared in the same way as in Comparative Example 1 and 0.3 mole of o-cresol were suspended in 200 ml of kerosene, and an ester interchange reaction was performed at 80° C. for 2 hours. After the reaction, 0.1 mole of ethyl benzoate was added, and the reaction was performed at 80° C. for an additional 2 hours. After the reaction, the resulting solid was collected by filtration, washed fully with hexane, and dried under reduced pressure.

The dried product was suspended in 300 ml of $TiCl_4$, and with stirring, reacted at 80° C. for 2 hours. While the reaction mixture was still hot after the reaction, the reaction product was collected by filtration, washed fully with hexane, and dried under reduced pressure. The resulting titanium catalyst component contained 3.2% by weight of titanium, 52% by weight of chlorine and 17.3% by weight of magnesium as atoms.

Polymerization

Propylene was polymerized in the same way as in Example 1 except that 0.03 millimole, calculated as titanium atom, of the titanium catalyst component obtained was used. White powdery polypropylene was obtained in an amount of 246 g. The polymer had a boiling n-heptane residue of 93%, a bulk density of 0.35 g/ml and a melt index of 5.8.

On the other hand, the liquid phase was concentrated to afford 6.7 g of a solvent-soluble polymer.

The average specific polymerization activity of this catalyst was 263 g-PP/Ti-mmole.hr.atm.

EXAMPLES 11 TO 14

Catalysts were prepared in the same way as in Example 6 except that the organic acid ester and $TiCl_4$ used in Example 6 were changed to the organic acid esters and the titanium compounds shown in Table 2. Using each of the catalysts obtained, propylene was polymerized in the same way as in Example 6. The results are shown in Table 2.

TABLE 2

| | | | Example 11 | Example 12 | Example 13 | Example 14 |
|---|---|---|---|---|---|---|
| Preparation of the μg-containing Ti component | Organic acid esters | Type | Ethyl cyclohexyl carboxylate | Propyl benzoate | Butyl acetate<br>Ethyl benzoate | Ethyl cyclohexyl carboxylate<br>Ethyl benzoate |
| | | moles | 0.1 | 0.1 | 0.02<br>0.08 | 0.02<br>0.08 |
| | Titanium compound | Type | $TiCl_4$ | $TiCl_4$ | $TiCl_4$ | $TiCl_4$<br>$Ti(OC_4H_9)_4$ |
| | | ml | 300 | 300 | 300 | 300 |
| | Analytical value (% by weight) | Ti | 2.7 | 3.0 | 2.9 | 3.3 |
| | | Cl | 58 | 59 | 59 | 58 |
| | | Mg | 18.2 | 18.6 | 17.9 | 18.9 |

TABLE 2-continued

|  |  | Example 11 | Example 12 | Example 13 | Example 14 |
|---|---|---|---|---|---|
| Results of polymerization | Yield of powdery polymer (g) | 224 | 283 | 262 | 275 |
| | Solvent-soluble polymer (g) | 6.8 | 5.7 | 5.4 | 7.0 |
| | Boiling n-heptane extraction residue (%) | 93 | 92 | 92 | 94 |
| | Specific polymerization activity (g-PP/Ti-mmole . hr . atm) | 240 | 300 | 279 | 294 |
| | Bulk density (g/ml) | 0.33 | 0.31 | 0.32 | 0.30 |
| | Melt index | 3.7 | 5.2 | 5.3 | 6.0 |

*Used as a mixture

COMPARATIVE EXAMPLE 3

Preparation of the catalyst component:

In the preparation of catalyst component in Example 1, the residue left after the removal of tetrahydrofuran was dried under reduced pressure without adding the kerosene and organic acid ester.

The resulting magnesium compound

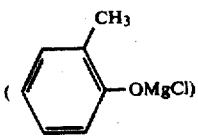

was suspended in TiCl$_4$, and with stirring, the suspension was reacted at 100° C. for 2 hours. After the reaction, the reaction mixture was hot-filtered by a glass filter, washed fully with refined hexane, and then dried under reduced pressure to afford a magnesium-containing solid titanium catalyst component. The resulting catalyst component contained 3.9% by weight of titanium, 61% by weight of chlorine and 20.0% by weight of magnesium as atoms.

Polymerization:

Propylene was polymerized in the same way as in Example 1 except that 0.03 millimole, calculated as titanium atom, of the resulting titanium catalyst component was used. White powdery polypropylene (43.7 g) and 4.8 g of a solvent-soluble polymer were obtained. The powdery polymer had a boiling n-heptane extraction residue of 89.6%. The specific polymerization activity of the catalyst was 51 g-PP/Ti-mmol. hr.atm.

COMPARATIVE EXAMPLE 4

A 2-liter autoclave was charged with 750 ml of hexane which had been fully deprived of oxygen and moisture, and at 40° C. in an atmosphere of propylene, 5.0 millimoles of triethyl aluminum and 0.05 millimole, calculated as titanium atom, of the magnesium-containing solid titanium catalyst component obtained in Comparative Example 3 were introduced into the autoclave. The reaction system was heated to 60° C., and the total pressure of propylene was raised to 8.0 kg/cm$^2$. Subsequently, 350 ml of hydrogen was introduced, and propylene was polymerized for 4 hours. After the polymerization, all the polymer was precipitated by adding methanol to afford 126 g of rubbery polypropylene having a boiling n-heptane extraction residue of 47.2%. The specific polymerization activity of the catalyst was 79 g-PP/Ti-mmol.hr.atm.

What we claim is:

1. A process for producing a polymer or copolymer of an olefin containing at least 3 carbon atoms which comprises polymerizing or copolymerizing at least one olefin containing at least 3 carbon atoms, or copolymerizing the olefin with up to 10 mole% of ethylene and/or a diolefin, in the presence of a catalyst composed of (A) a magnesium-containing solid titanium composition and (B) an organo-aluminum compound; characterized in that the solid titanium composition (A) is a composition consisting essentially of the product formed by contacting (i) a halogen-containing magnesium organo-aromatic compound of the formula Mg(OR)Cl wherein R represents a radical selected from the group consisting of phenyl, naphthyl, lower alkyl-substituted phenyl, lower alkyl-substituted naphthyl, lower alkoxy-substituted phenyl, lower alkoxy-substituted naphthyl, halogen-substituted phenyl, halogen-substituted naphthyl, phenyl lower alkyl, lower alkyl-substituted phenyl lower alkyl, lower alkoxy-substituted phenyl lower alkyl and halogen-substituted phenyl lower alkyl, with (ii) an organic acid ester at a temperature of about 0° to 200° C. in the absence of mechanical pulverization, and further contacting the resultant product with (iii) a tetravalent titanium compound of the formula Ti-(OR')$_g$X$_{4-g}$ wherein R' is an alkyl group containing 1 to 8 carbon atoms, X is a halogen atom and g is 0 to 4, at room temperature to 130° C. in the absence of mechanical pulverization, so as to form the solid titanium composition in which the amounts of titanium, magnesium, halogen and organic acid ester are respectively 1–5% by weight, 10–25% by weight, 40–65% by weight and 5–20% by weight, said organic acid ester (ii) being a member selected from the group consisting of (a) esters formed between carboxylic acids or halogensubstituted derivatives selected from saturated or unsaturated aliphatic carboxylic acids containing 1 to 18 carbon atoms and halogen-substituted derivatives thereof and alcohols or phenols selected from saturated or unsaturated aliphatic primary alcohols containing 1 to 18 carbon atoms, saturated or unsaturated alicyclic alcohols containing 3 to 8 carbon atoms, phenols containing 6 to 10 carbon atoms and C$_1$–C$_4$ saturated or unsaturated aliphatic primary alcohols bonded to the ring carbon atom of a C$_3$–C$_{10}$ aliphatic or aromatic ring, (b) aliphatic lactones containing 3 to 10 carbon atoms, (c) an ester formed between an alicyclic carboxylic acid containing 6 to 12 carbon atoms and a saturated aliphatic primary alcohol containing 1 to 8 carbon atoms, (d) esters formed between aromatic carboxylic acids containing 7 to 18 carbon atoms and alcohols or phenols selected from saturated or unsaturated aliphatic primary alcohols containing 1 to 18 carbon atoms, saturated or unsaturated alicyclic alcohols containing 3 to 8 carbon atoms, phenols containing 6 to 10 carbon atoms and C$_1$–C$_4$ saturated or unsaturated aliphatic primary alcohols bonded to the ring carbon atoms of a $C_3-C_{10}$ aliphatic or aromatic ring, and (e) aromatic lactones containing 8 to 12 carbon atoms and the organo-aluminum compound (B) is selected from the group consisting of trialkyl aluminum, alkenyl aluminum, alkyl aluminum alkoxide, alkyl aluminum hydride and alkyl aluminum halide.

2. The process of claim 1 wherein the organic acid ester (ii) is a member selected from the group consisting of (a) esters formed between carboxylic acids or halogen-substituted derivatives selected from saturated or unsaturated aliphatic carboxylic acids containing 1 to 18 carbon atoms and halogen-substituted derivatives thereof and alcohols or phenols selected from saturated or unsaturated aliphatic primary alcohols containing 1 to 18 carbon atoms, saturated or unsaturated alicyclic alcohols containing 3 to 8 carbon atoms, phenols containing 6 to 10 carbon atoms and $C_1-C_4$ saturated or unsaturated aliphatic primary alcohols bonded to the ring carbon atom of a $C_3-C_{10}$ aliphatic or aromatic ring, and (b) lactones containing 3 to 10 carbon atoms.

3. The process of claim 1 wherein the organic acid ester (ii) is an ester formed between an alicyclic carboxylic acid containing 6 to 12 carbon atoms and a saturated or unsaturated aliphatic primary alcohol containing 1 to 8 carbon atoms.

4. The process of claim 1 wherein the organic acid ester (ii) is a member selected from the group consisting of (a) esters formed between aromatic carboxylic acids containing 7 to 18 carbon atoms and alcohols or phenols selected from saturated or unsaturated aliphatic primary alcohols containing 1 to 18 carbon atoms, saturated or unsaturated alicyclic alcohols containing 3 to 8 carbon atoms, phenols containing 6 to 10 carbon atoms and $C_1-C_4$ saturated or unsaturated aliphatic primary alcohols bonded to the ring carbon atoms of a $C_3-C_{10}$ aliphatic or aromatic ring, and (b) aromatic lactones containing 8 to 12 carbon atoms.

5. The process of claim 1 wherein the polymerization or copolymerization is carried out in the presence of a catalyst formed by adding an organic acid ester in addition to the components (A) and (B).

6. The process of claim 5 wherein said organic acid ester is a member selected from the group consisting of esters formed between benzoic acid unsubstituted or substituted by a substituent selected from the group consisting of alkyl groups containing 1 to 4 carbon atoms, alkoxyl groups containing 1 to 4 carbon atoms, a hydroxyl group and an amino group, and a member selected from the group consisting of $C_1-C_{18}$ saturated or unsaturated aliphatic primary alcohols, $C_3-C_8$ saturated or unsaturated alicyclic alcohols and $C_6-C_{10}$ phenols.

7. The process of claim 1 wherein the polymerization or copolymerization is carried out at a temperature of 20° to 200° C. under atmospheric pressure to about 50 kg/cm².

8. The process according to claim 1 wherein the organo-aluminum compound (B) the alkyl group contains from 1 to 13 carbon atoms; the alkenyl group contains from 2 to 13 carbon atoms; and the alkoxy groups contain from 1 to 13 carbon atoms.

9. The process according to claim 8 wherein the organo-aluminum compound (B) is a trialkyl aluminum.

* * * * *